April 21, 1959     K. L. DUENKE     2,883,640
TRANSFORMER BUSHING ASSEMBLY
Filed March 19, 1956

Kenneth L. Duenke,
Inventor.
Koenig and Pope,
Attorneys.

United States Patent Office 2,883,640
Patented Apr. 21, 1959

2,883,640

TRANSFORMER BUSHING ASSEMBLY

Kenneth L. Duenke, Richmond Heights, Mo., assignor, by mesne assignments, to The Clarken Company, Kirkwood, Mo., a corporation of Missouri Application March 19, 1956, Serial No. 572,471

4 Claims. (Cl. 339—202)

This invention relates to transformer bushing assemblies, and more particularly to a line connector construction for such an assembly.

Among the several objects of the invention may be noted the provision of a transformer bushing assembly having an improved screw-threaded clamp type of connector for connecting a power line or lines to a transformer; the provision of a connector of the class described having a clamp screw and which is so constructed that the screw spins free if unscrewed beyond a predetermined limit to avoid the possibility of thread stripping or other damaging of parts of the connector; the provision of a connector of this class adapted for resilient clamping of a line wire or wires to compensate for expansion and contraction due to ambient temperature variations; and the provision of a connector of the class described which is economical to manufacture and reliable in use. Other objects and feaures will be in part apparent and in part pointed out hereinafter.

The invention accordingly comprises the constructions hereinafter described, the scope of the invention being indicated in the following claims.

Figure 1:
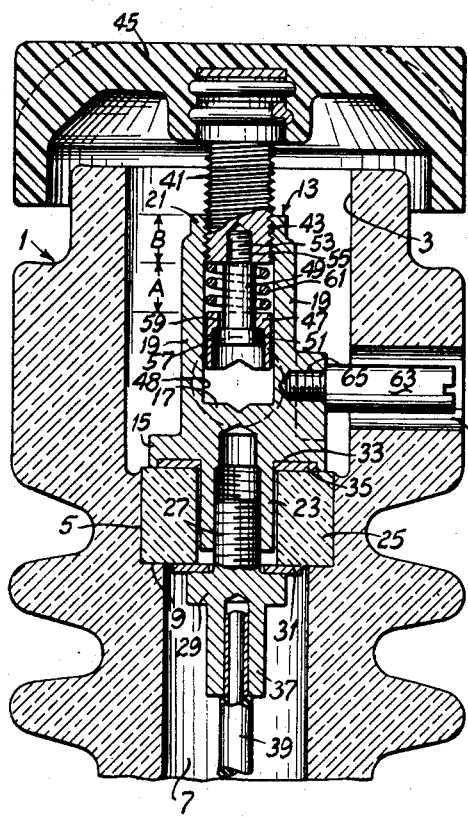
Figure 2:
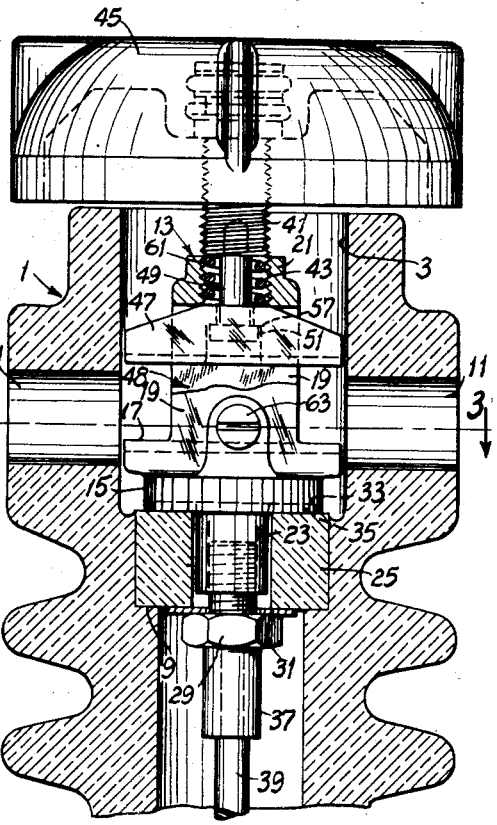
Figure 3:
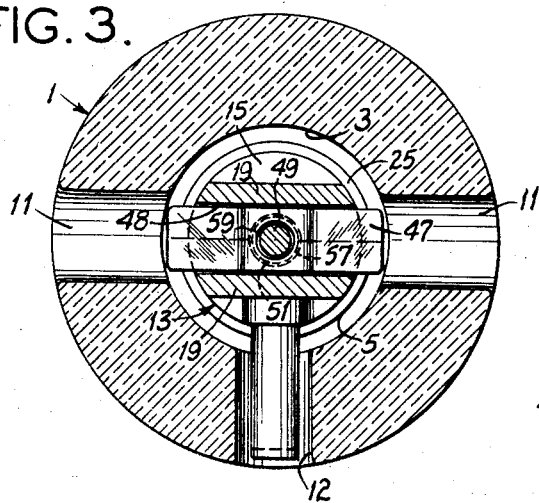

In the accompanying drawings, in which one of various possible embodiments of the invention is illustrated, Fig. 1 is a longitudinal cross section, with parts broken away, of a transformer bushing assembly in which a connector of this invention is incorporated;

Fig. 2 is a longitudinal cross section of the assembly in a plane at 90° to the Fig. 1 cross section showing a moved position of parts; and, Fig. 3 is a transverse cross section taken on line 3—3 of Fig. 2.

Corresponding reference characters indicate corresponding parts throughout the several views of the drawings.

Referring to the drawings, there is indicated at 1 a porcelain bushing adapted for mounting on a transformer (not shown). The bushing has a recess 3 at one end (its outer end). At the inner end of recess 3 is a smaller recess 5. A passage 7 extends from recess 5 to the other end of the bushing. At the inner end of recess 5 is a shoulder 9. The bushing has diametrically opposed lateral holes 11 leading into the recess 3, and a lateral hole 12 leading into the recess 3 at right angles to holes 11.

A connector clamp body 13 is received in the recess 3. The clamp body 13, which may be cast of bronze or any other suitable metal, is formed to have a circular base 15, a jaw 17 on the base, side walls 19 at opposite sides of the jaw, and a head 21 spanning the outer ends of the side walls. It is also formed to have a tubular extension 23 which projects from the base 15 into a porcelain insert 25 of ring shape. Insert 25 is affixed in the recess 5 by firing in a high temperature furnace. It bears against shoulder 9. The extension 23 is internally threaded. A screw 27 having a head 29 is threaded into the extension 23 to hold the body 13 to the insert 25.

A washer 31 is interposed between the head 29 and the insert 25. The base 15 of the body 13 has a recess 33 around the extension 23 receiving a gasket 35. The screw 27 has a tubular extension 37 from its head 29 receiving a lead 39 which connects to the transformer.

A screw 41 is threaded in a threaded opening 43 in the head of the body 13, and is movable axially toward the jaw 17 on rotation in one direction, and away from the jaw 17 on rotation in the other direction. Fixed on the outer end of the screw for turning it is a cap 45 of electrical insulation material, such as a phenolic resin. A jaw 47 is carried by the screw at its inner end for axial movement therewith. The jaw 47 is received in the slot 48 defined by the side walls 19 of the body 13. These walls act as means for preventing rotation of the jaw. The movable jaw 47 is cooperable with the fixed jaw 17 on the body 13 for clamping a wire therebetween.

The connection between the screw 41 and the movable jaw 47 is such that the screw is rotatable relative to the movable jaw. It is also such that the movable jaw 47 is normally spaced from the end of the thread on the screw a distance greater than the length of the thread in the opening 43 in the head 21 of the body 13, so that rotation of the screw in the direction for moving it away from the fixed jaw 17 beyond a predetermined limit results in disengagement of the thread on the screw from the thread in opening 43.

More particularly, the connection between the screw 41 and the movable jaw 47 comprises a jaw-carrying stud 49 having a head or abutment 51 at one end and a reduced threaded portion 53 at its other end which is threaded into a tapped hole 55 in the end of the screw. The head of the stud is received in a recess 57 in the jaw 47 and the stud extends from the recess 57 through a hole 59 in the jaw 47 of smaller diameter than the recess. The jaw 47 is axially movable on the stud within limits relative to the screw 41. A coil compression spring 61 surrounds the stud 49 between the end of the screw 41 and the jaw 47 for biasing the jaw away from the end of the screw to an extended position bearing against the head 51 of the stud. In this extended position of the jaw 47, it is spaced from the end of the thread on the screw 41 the distance indicated at A in Fig. 1. This distance is slightly greater than the length of the thread in opening 43, which is indicated at B in Fig. 1.

A spark gap member 63 is threaded in a tapped hole 65 in one side of the body 13 through the lateral hole 12. With member 63 in the hole 12, the body 13 is positioned with the slot 48 registering with the lateral holes 11.

To clamp a line wire to the transformer bushing assembly, the cap 41 is turned to move the movable jaw 47 away from the fixed jaw 17. Then the bared end of the line wire is inserted between the jaws 17 and 47 through one of the holes 11. The cap is then turned to move the movable jaw 47 toward the fixed jaw 17 yieldingly to clamp the bared end of the wire between the jaws. After the movable jaw 47 has engaged the wire, rotation of the cap is continued to compress the spring 61. Movement of the jaw 47 away from jaw 17 is permitted by the spring to allow for thermal expansion of the wire, and the spring maintains the wire tightly clamped upon thermal contraction of the wire.

It is impossible to damage the connector by excessive turning of the cap in unscrewing direction. Excessive turning simply results in disengagement of the thread on the screw 41 from the thread in the opening 43 of the head 21 of the body 13 (see Fig. 2). Thereafter, the screw simply rotates freely if turned in unscrewing direction, the stud 49 rotating freely in the movable jaw 47. Reengagement of the thread on the screw 41 with the thread in the opening 43 may be readily effected simply by turning the screw in the direction for clamping.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In a transformer bushing having a recess in one end thereof and a passage for a wire extending laterally with respect to the recess, a clamp body in the recess formed to provide a fixed jaw facing in the direction toward said one end of the bushing for clamping thereagainst of a wire inserted in said passage, said clamp body having wall means extending beyond said fixed jaw in the direction toward said one end of the bushing and a head at the outer end of said wall means opposed to said fixed jaw, said wall means being formed to allow for insertion of a wire through said passage over said fixed jaw, said head having a threaded opening therein extending lengthwise of the bushing, a member having a screw-threaded portion threaded in said opening and being movable axially toward said fixed jaw upon rotation in one direction and away from said fixed jaw upon rotation in the other direction, said member having a jaw-carrying portion extending inward from said screw-threaded portion, a movable jaw carried by said jaw-carrying portion, said member being rotatable relative to the movable jaw, said movable jaw being axially movable with said member and cooperable with the fixed jaw for clamping a wire against the fixed jaw, said movable jaw being engageable with said wall means to hold it against rotation, said movable jaw being spaced from the inner end of said screw-threaded portion a distance greater than the length of the thread in said opening in said head, whereby excessive rotation of said member in said other direction results in separation of said screw-threaded portion of said member from the thread in said opening, and said movable jaw being engageable with the head to hold said member captive to said clamp body upon said separation.

2. In a transformer bushing having a recess in one end thereof and a passage for a wire extending laterally with respect to the recess, a clamp body in the recess formed to provide a fixed jaw facing toward said one end of the bushing for clamping thereagainst of a wire inserted in said passage, said clamp body having wall means extending beyond said fixed jaw toward said one end of the bushing and a head at the outer end of said wall means opposed to said fixed jaw, said wall means being formed to allow for insertion of a wire through said passage over said fixed jaw, said head having a threaded opening therein extending lengthwise of the bushing, a member having a scre-threaded portion threaded in said opening and being movable axially toward said fixed jaw upon rotation in one direction and away from said fixed jaw upon rotation in the other direction, said member having a jaw-carrying portion extending inward from said screw-threaded portion, a movable jaw carried by said jaw-carrying portion and being movable axially relative to said member toward and away from an extended position relative to said screw-threaded portion, means biasing said movable jaw toward its said extended position, said member being rotatable relative to the movable jaw, said movable jaw being axially movable with said member and cooperable with the fixed jaw for yieldingly clamping a wire against the fixed jaw, said movable jaw being engageable with said wall means to hold it against rotation, said movable jaw when in its said extended position being spaced from the inner end of said screw-threaded portion a distance greater than the length of the thread in said opening in said head, whereby excessive rotation of said member in said other direction results in separation of said screw-threaded portion of said member from the thread in said opening, and said movable jaw being engageable with the head on outward movement of said member to hold said member captive to said clamp body upon said separation.

3. In a transformer bushing having a recess in one end thereof and a passage for a wire extending laterally with respect to the recess, a clamp body in the recess formed to provide a fixed jaw facing toward said one end of the bushing for clamping thereagainst of a wire inserted in said passage, said clamp body having side walls extending at opposite sides of said fixed jaw in the direction toward said one end of the bushing and a head spanning the outer ends of said side walls and opposed to said fixed jaw, said side walls being located at opposite sides of said passage to allow for insertion of a wire through said passage over said fixed jaw, said head having a threaded opening therein extending lengthwise of the bushing, a member having a screw-threaded portion threaded in said opening and being movable axially toward said fixed jaw upon rotation in one direction and away from said fixed jaw upon rotation in the other direction, said member having a jaw-carrying portion extending inward from said screw-threaded portion, said jaw-carrying portion having an abutment at the end thereof toward said fixed jaw, a movable jaw mounted on said jaw-carrying portion and being slidable thereon toward and away from an extended position in engagement with said abutment, means biasing said movable jaw toward its said extended position, said member being rotatable relative to the movable jaw, said movable jaw being axially movable with said member and cooperable with the fixed jaw for yieldingly clamping a wire against the fixed jaw, said movable jaw being engageable with said side walls to hold it against rotation, said movable jaw when in its said extended position being spaced from the inner end of said screw-threaded portion a distance greater than the length of the thread in said opening in said head, whereby excessive rotation of said member in said other direction results in separation of said screw-threaded portion of said member from the thread in said opening, and said movable jaw being engageable with the head on outward movement of said member to hold said member captive to said clamp body upon said separation.

4. In a transformer bushing having a recess in one end thereof and a passage for a wire extending laterally with respect to the recess, a clamp body in the recess formed to provide a fixed jaw facing toward said one end of the bushing for clamping thereagainst of a wire inserted in said passage, said clamp body having side walls extending at opposite sides of said fixed jaw in the direction toward said one end of the bushing and a head spanning the outer ends of said side walls and opposed to said fixed jaw, said side walls being located at opposite sides of said passage to allow for insertion of a wire through said passage over said fixed jaw, said head having a threaded opening therein extending lengthwise of the bushing, a screw threaded in said opening and being movable axially toward said fixed jaw upon rotation in one direction and away from said fixed jaw upon rotation in the other direction, a stud of smaller diameter than said screw extending inward from said screw, said stud having a head at the end thereof toward said fixed jaw, a movable jaw mounted on said stud and being slidable thereon toward and away from an extended position in engagement with the head on the stud, a spring surrounding said stud biasing said movable jaw toward its said extended position, said stud being rotatable relative to the movable jaw, said movable jaw being axially movable with said screw and stud and cooperable with the fixed jaw for yieldingly clamping a wire against the fixed jaw, said movable jaw being engageable with said side walls to hold it against rotation, said movable jaw when in its said extended position being spaced from the inner end of said screw a distance greater than the length of the thread in said opening in said clamp body head, whereby excessive rotation of said screw in said other direction results in separation of said screw from the thread in said opening, and said movable jaw being engageable with the clamp body head on outward movement of said screw to hold said screw captive to said clamp body upon said separation.

References Cited in the file of this patent

UNITED STATES PATENTS

| | | |
|---|---|---|
| 1,407,858 | Harter | Feb. 28, 1922 |
| 1,916,488 | Parrish | July 4, 1933 |
| 2,205,322 | Thomas et al. | June 18, 1940 |
| 2,740,100 | Broverman | Mar. 27, 1956 |

FOREIGN PATENTS

| | | |
|---|---|---|
| 184,942 | Great Britain | Aug. 31, 1922 |
| 877,015 | Germany | May 18, 1953 |